United States Patent [19]

Worthington

[11] Patent Number: 4,615,182
[45] Date of Patent: Oct. 7, 1986

[54] EVAPORATIVE AIR CONDITIONER
[75] Inventor: William Worthington, Glenalta, Australia
[73] Assignee: Dalgety Australia Operations Limited, Sydney, Australia
[21] Appl. No.: 616,962
[22] Filed: Jun. 4, 1984
[51] Int. Cl.[4] ............................................. F28D 5/00
[52] U.S. Cl. ..................................... 62/310; 62/304; 261/27; 261/19
[58] Field of Search ................. 62/304, 309, 310, 311, 62/171; 261/151, 19, 27

[56] References Cited

U.S. PATENT DOCUMENTS

| 2,566,366 | 9/1951 | Pennington | 62/309 |
| 2,939,687 | 6/1960 | Goettl | 62/309 |
| 3,013,401 | 12/1961 | Rigternik | 62/171 X |
| 4,232,531 | 11/1980 | Mangam, Jr. et al. | 62/171 |
| 4,289,713 | 9/1981 | Goettl | 62/310 X |

FOREIGN PATENT DOCUMENTS 106337  6/1983  Japan ..................................... 62/314

Primary Examiner—Henry Bennett
Attorney, Agent, or Firm—McAulay, Fields, Fisher, Goldstein & Nissen

[57] ABSTRACT

An evaporative air conditioner wherein a radial fan is actuated through a speed controller independently of the water pump to maintain water flow at low fan speed and including water channels arranged to restrict water flow noises.

11 Claims, 4 Drawing Figures

EVAPORATIVE AIR CONDITIONER

FIELD OF THE INVENTION

This invention relates to an evaporative air conditioner, in particular it relates to a conditioner of the type which utilizes a tank adapted to hold the cooling fluid, such as water, and including air circulatory means to force air through a permeable pad and into the space being cooled and including a pump assembly to circulate water from the tank over the permeable pad to maintain evaporative conditions.

Units of this type have been constructed heretofore and a popular unit is one which is of a portable nature so that it can be moved room to room in a dwelling but the units can also be of a fixed nature to circulate cooled air into a required area.

Units of this type are generally noisy because of the air flow required through the evaporative pad and because of the general structure of the devices as at present in use.

THE PRIOR ART

According to one such unit, the subject of Australian Letters Patent No. 439,142 of Aug. 27, 1968 a special pump is used with a by-pass to control water flow. This unit also has a radial air circulating member, the purpose of the by-pass being to allow water flow to be reduced below the normal pump capacity to prevent less contamination by salt or the like of the permeable pad over which the water flows.

According to another such unit, the subject of Australian Letters Patent No. 461,152 of July 9, 1971 a radial air circulating member can be put into communication with either an evaporative cooler unit comprising an air permeable pad and pump means to circulate water over the pad, or with a gas fired heater unit so that the radial air circulating member can blow heated or cooled air into a space to be conditioned.

Australian Patent Application No. 57824 dated July 6, 1973 is for a similar device but using a refrigeration unit instead of gas heating.

OBJECTS OF THE INVENTION

It is the object of this invention to provide a low noise evaporative air cooler.

It is a further object to provide an air cooler in which the volume of air cooled can be varied.

It is a further object to provide a simple and effective construction by means of which the required cooling is obtained while allowing a variation in air flow through the unit.

SUMMARY OF THE INVENTION

The objects of the invention are achieved by using an axial fan driven by a motor the speed of which can be varied and to position this fan adjacent to an air permeable pad in such a manner that a relatively small depth only is required for the unit, the unit including water pump assembly which is driven independently of the air circulating fan.

According to this invention the water pump assembly comprises a pump submerged in a water tank at the base of the unit and the pump is coupled to a driving motor positioned above the water content area of the tank and is powered independently of the fan.

The fan because it is of the axial flow type as opposed to the radial type usually used in such units, requires less depth for its mounting and can be very conventionally positioned to ensure that the air flow through the permeable pad is substantially uniform over the area, the air flow leaving the housing of the device through a front grill.

The speed of the fan motor is however variable by a controller so that the air circulation can be varied, but irrespective of the air flow the water pump maintains a constant speed so that there is at all times an adequate flow through the air permeable pad irrespective of whether the fan is operating at high capacity or at low capacity.

Figure 1:
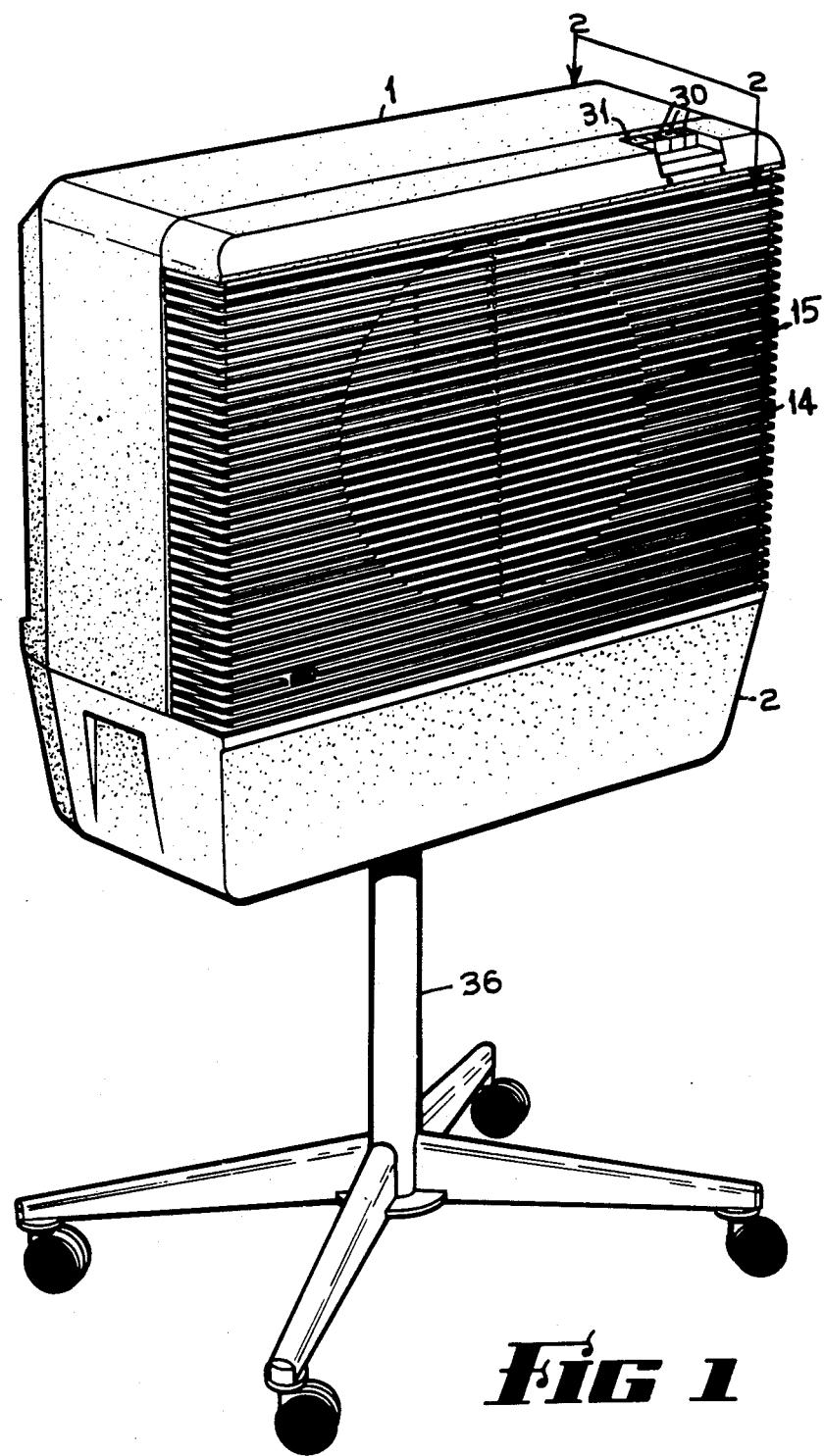
FIG. 1 is a perspective view of a portable evaporative air conditioner unit.
Figure 2:
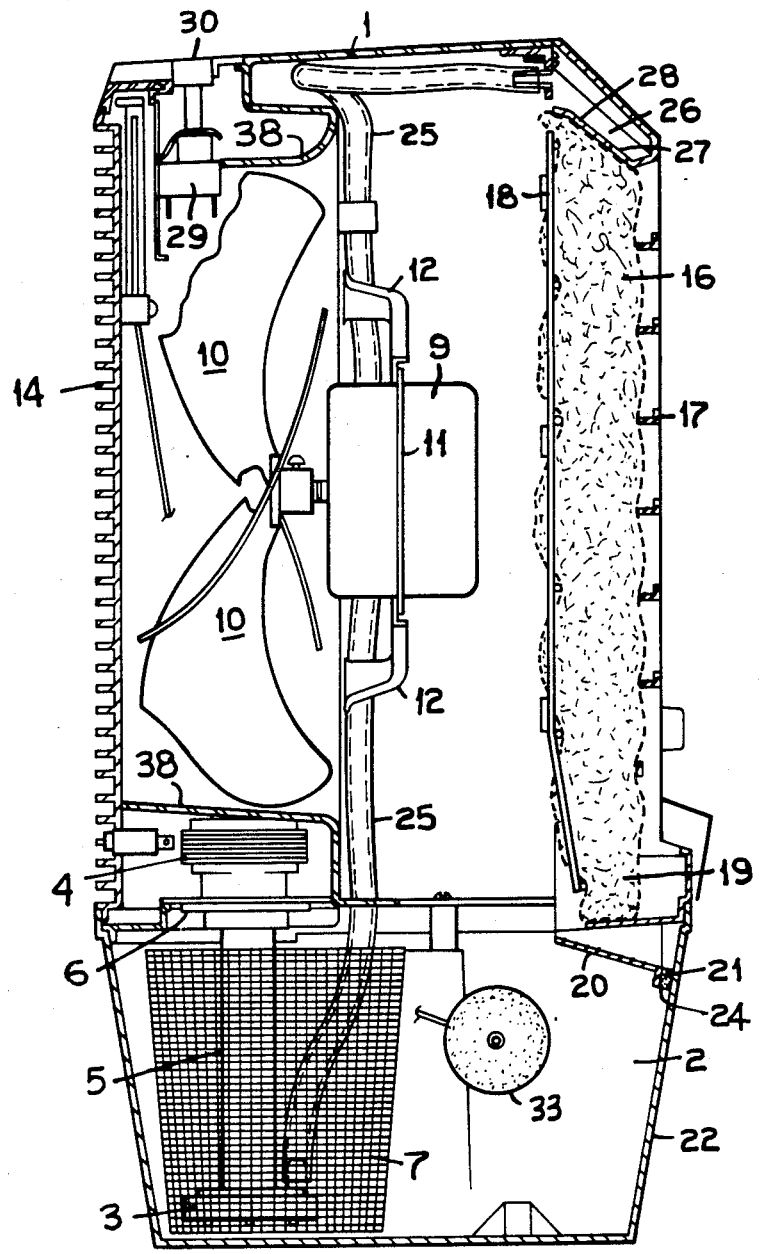
FIG. 2 is a transverse section of same generally on the plane 2—2 of FIG. 1 showing the components of the unit, the fan shroud being sectioned to show the fan blades.

Thus the invention comprises a housing having a water tank at a base portion and having support means and mounting means for a radial fan assembly and for a water pump assembly, a radial fan assembly disposed in the housing between an air inlet at a first face of the housing and an air outlet at a second opposite face of the housing, the assembly including a driving motor, a permeable pad extending across the air inlet in the housing and supported by grill means and having a water distributor channel longitudinally extensive over the permeable pad and water collector means below the pad, a water pump assembly extending into the tank arranged to pump water from the tank into the water distributor channel, the pump assembly including a separate driving motor, switch and electrical circuit means on the housing to allow energization of both the motor of the fan assembly and the motor of the pump assembly, and control means between the switch means and the motor of the fan assembly, whereby to allow the speed of rotation of the fan to be selected independently of the speed of the pump assembly whereby to maintain a constant water flow rate over the permeable pad irrespective of fan speed.

DETAILED DESCRIPTION OF PREFERRED EMBODIMENT

A housing 1 supports on it a water tank 2 in which is positioned the water pump 3 which is driven from the water pump motor 4 through an elongated shaft passing through a tubular support 5 carrying the water pump 3 at its one end and the water pump motor 4 at its other end, a tubular support 5 having a flange 6 coupled to the housing 1 to support the unit, the pump 3 and motor 4 being herein referred to as the pump assembly.

The water tank 2 has a screen 7 in it around the pump 3 to keep coarser sediment from reaching the pump.

The fan assembly comprises the fan motor 9 which drives the fan blades 10, the motor 9 having a flange 11 which is connected to supports 12 carried by the housing 1 and this fan is protected at the front of the unit by a front grill 14 which has an opening 15 of about the same area as the swept area of the blades 10 of the fan assembly, and has at its rear the air permeable pad 16 through which air is drawn by the fan blades 10 and discharged through the opening 15 in the front grill 14 into the area to be cooled.

The air permeable pad 16 is held in place between a rear grill 17 and an inner open mesh support 18 and this air permeable pad 16 is shaped to have a downwardly tapered portion 19 at its lower end to direct water flowing through the pad onto a baffle 20 which discharge the water into a channel 21 terminating adjacent the rear wall 22 of the water tank 2 so that water flowing from the permeable pad 16 is directed against the wall 22 of the water tank 2 to flow down it and avoid noise which would otherwise exist if the water was allowed to flow directly from the pad 16 into the water tank 2. The channel 21 has a pervious strip 24 disposed in it to further assist in discharging the water against the wall 22.

The water for the air permeable pad 16 is taken through a supply tube 25 to the top of the housing 1 and discharges into a water distributor 26 which extends along the housing and has a series of apertures 27 at a lower part through which the water flows to the air permeable pad.

This water distributor 26 again has a sloping wall 28 to minimize noise as the water leaves the supply tube 25 and flows on to the sloping wall 28 and then through the apertures 27 into the permeable pad 16.

Figure 4:
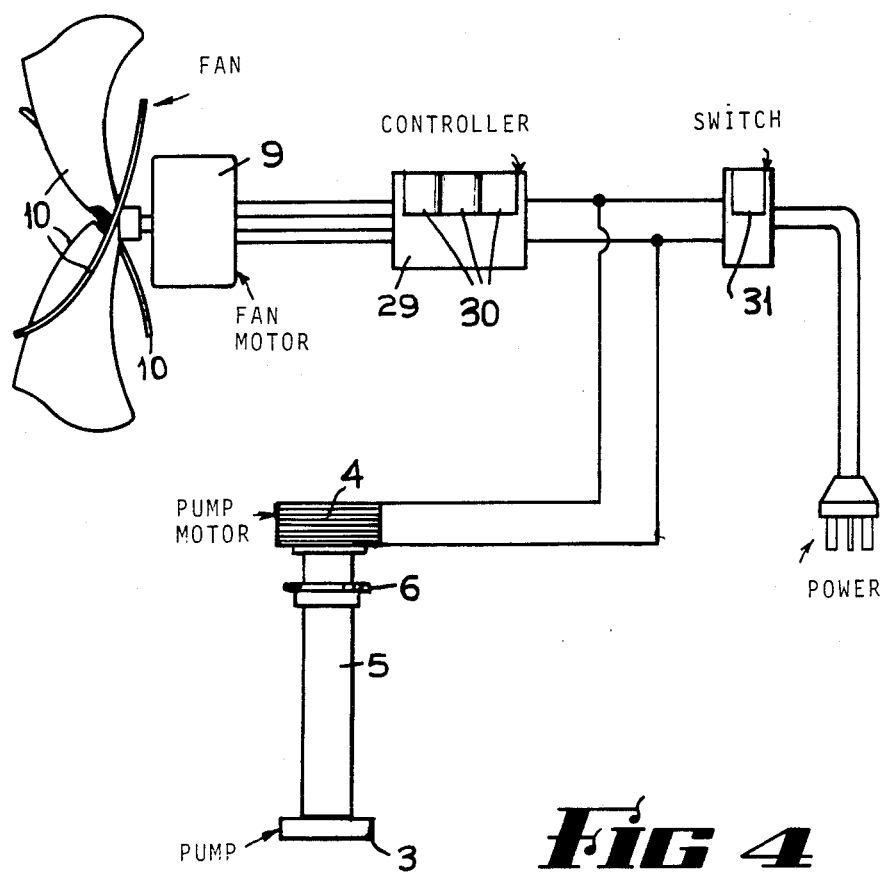
FIG. 4 is a circuit diagram of the unit.

As will be seen from FIG. 4 the circuit of the unit is such that the motor 4 which drives the water pump 3 is independently energized, as is the fan motor 9, but to enable the capacity of the air flow to be varied, the fan motor 9 is provided with a controller 29 which comprises a series of control switches 30, manipulation of which varies the motor speed and thus the amount of air being moved by the fan assembly. A master switch 31 switches both the motors 4 and 9 on or off.

In this way as the water flow to the air and water permeable pad 16 can be maintained at a set value so that the pad is at all times saturated to give the most effective cooling, but in cases where a substantial air flow through the pad is not required the fan 9-10 can be slowed down to pass only a low volume of air through the pad and discharge it through the front grill 14 into the area to be cooled. In this way quiet operation is obtainable because generally considerable noise is generated by any device which has to displace a reasonable volume of air and move it through the air permeable pad and grill.

As however according to this invention the pad is maintained in its best condition so far as the evaporative action is concerned, efficient cooling still results when the fan is slowed down to give a relatively low air flow through the unit.

Figure 3:
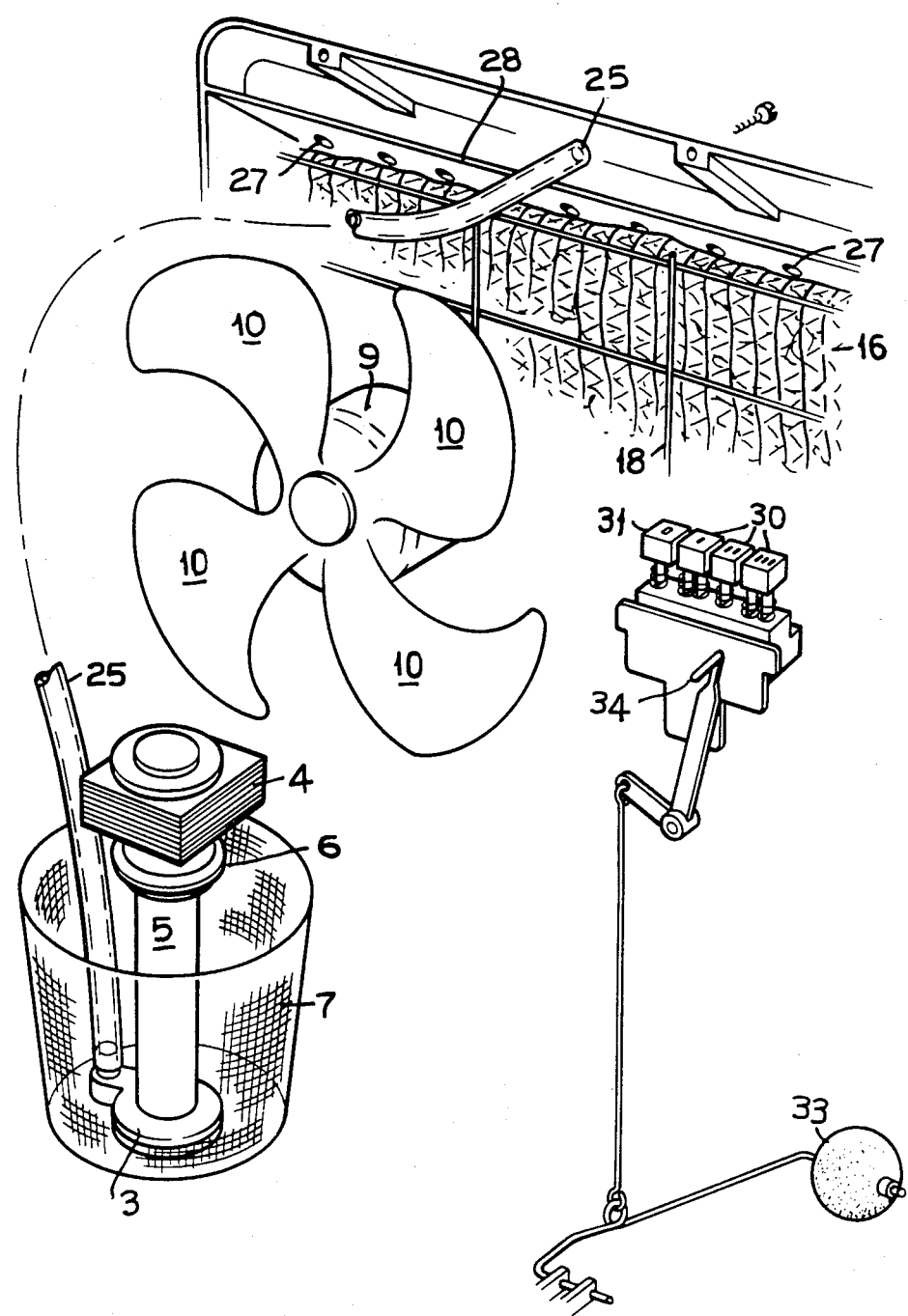
FIG. 3 is a schematic exploded view showing the principal components of the unit.

FIG. 3 shows a water level float 33 and indicator 34. The unit is preferably supported on a wheeled stand 36.

The housing has a shroud 38 which extends around the fan to direct the air drawn through the permeable pad through the opening 15 in the front grill 14.

It will be realised from the foregoing that firstly the construction is such that the water flow through the unit is maintainable at a sufficient volume to have most effective evaporation from the permeable pad 16 under all working conditions and because of the manner in which the flow is channelled the water flow creates a minimum of noise by for instance flowing over the sloping wall 28 at the top of the permeable pad and flowing down the wall 22 of the water tank 2 to return into the body of water in the tank without introducing a noise factor. Similarly the use of an axial fan allows quiet air flow to be achieved because by shaping the blades correctly such fans are now able to reduce noise materially.

The invention allows efficient evaporation conditions even at low air flow and because of the use of an axial flow fan very low noise is possible.

I claim:

1. An evaporative air conditioner comprising
(a) a housing having a water tank at a base portion and having support means and mounting means for a radial fan assembly and for a water pump assembly,
(b) a radial fan assembly disposed in said housing between an air inlet at a first face of the said housing and an air outlet at a second opposite face of said housing, said assembly including a driving motor,
(c) a permeable pad extending across the said air inlet in the said housing and supported by grill means and having a water distributor channel longitudinally extensive over the said permeable pad and water collector means below the said pad, said water collector means comprising a wall adjacent the lower end of the said permeable pad, which collector means extends along the rear wall of said tank and slopes downward to a channel formed between said sloping wall and tank whereby to guide the water from the said permeable pad against the said wall of the tank,
(d) a water pump assembly extending into the said tank arranged to pump water from said tank into said water distributor channel, said pump assembly including a separate driving motor,
(e) switch and electrical circuit means on the said housing to allow energization of both the motor of the said fan assembly and the motor of the said pump assembly, and
(f) control means between the said switch means and the motor of the said fan assembly, whereby to allow the speed of rotation of the said fan to be selected independently of the speed of the said pump assembly whereby to maintain a constant water flow rate over the said permeable pad irrespective of fan speed.

2. An evaporative air conditioner according to claim 1 wherein the said channel has in it a pervious strip in contact with the said wall of the tank to cause the water to flow from the said strip along the said wall of the tank.

3. An evaporative air conditioner comprising:
(a) a housing having a support tank at a base portion and having support means and mounting means for a radial fan assembly and for a water pump assembly;
(b) a radial fan assembly disposed in said housing between an air inlet at a first face of said housing and an air outlet at a second opposite face of said housing, said assembly including a driving motor;
(c) a permeable pad extending across said air inlet in said housing and supported by grill means and having a water distributor channel longitudinally extensive over said permeable pad and water collector means below said pad, said water collector comprising a wall adjacent the lower end of said permeable pad, said collector extending along the rear wall of said tank and sloping downwardly to a channel formed between said sloping wall and said tank whereby to guide the water from said permeable pad against said wall of the tank;

(d) a water pump assembly extending into said tank arrannged to pump water from said tank into said water distributor channel, said pump assembly including a separate driving motor;

(e) switch and electrical circuit means on said housing to allow energisation of both the motor of said fan assembly and the motor of said pump assembly; and (f) control means between said switch means and the motor of said fan assembly, whereby to allow the speed of rotation of said fan to be selected independently of the speed of said pump assembly whereby to maintain a constant water flow rate over said permeable pad irrespective of fan speed.

4. An evaporative air conditioner according to claim 3, wherein said water distributor channel includes a wall sloping downwards from the outlet of a tube arranged to deliver water from said pump assembly to said distributor channel and apertures along a lower part of said sloping wall adjacent the top of said permeable pad to distribute water to said permeable pad.

5. An evaporative air conditioner according to claim 3, wherein said permeable pad is in contact with said wall whereby water flows from said distributor channel into said pad.

6. An evaporative air conditioner according to claim 3, wherein said channel has in it a pervious strip in contact with said wall of said tank to cause water to flow from said strip along said wall of the tank.

7. An evaporative air conditioner according to claim 3, wherein said air outlet is formed through a grid and said housing is shaped to direct air from said fan through said grid, said fan being shaped to draw air through said air permeable pad.

8. An evaporative air conditioner according to claim 3, wherein said switch and electrical circuitry means comprise a first switch connected to control operation of both the motor of said fan assembly and the motor of said pump assembly, and an added switch means connected to control the rotational speed of the motor of said fan assembly whereby to allow variation of the air flow through said housing of the air conditioner independently of the water flow taking place through said permeable pad.

9. An evaporative air conditioner according to claim 3, wherein said driving motor of said water pump assembly is connected by a tubular support to said water pump whereby said water pump driving motor is disposed above said tank and said pump is disposed in the bottom of said tank, and including a tube leading from said pump to discharge into said water distributor.

10. An evaporative air conditioner according to claim 5, wherein said channel has in it a pervious strip in contact with said wall of said tank to cause water to flow from said strip along said wall of the tank.

11. An evaporative air conditioner according to claim 10, wherein said switch and electrical circuitry means comprise a first switch connected to control operation of both the motor of said fan assembly and the motor of said pump assembly, and an added switch means connected to control the rotational speed of the motor of said fan assembly whereby to allow rotation of the air flow through said housing of the air conditioner independently of the water flow taking place through said permeable pad.

* * * * *